(12) United States Patent
Nicholson et al.

(10) Patent No.: US 7,908,833 B2
(45) Date of Patent: Mar. 22, 2011

(54) MOWER FRAME WITH COMPACT MOUNTING FOR DUAL HYDRAULIC PUMP/MOTOR ASSEMBLIES

(75) Inventors: Gary L. Nicholson, Beatrice, NE (US);
John A. Swanson, Odell, NE (US);
Jeremy J. Tate, Beatrice, NE (US);
Steven C. Finkner, Adams, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 12/706,312

(22) Filed: Feb. 16, 2010

(65) Prior Publication Data
US 2010/0139232 A1    Jun. 10, 2010

Related U.S. Application Data

(63) Continuation of application No. 12/009,631, filed on Jan. 20, 2008, now abandoned.

(51) Int. Cl.
*A01D 69/00* (2006.01)
(52) U.S. Cl. ........................................ 56/11.9; 180/6.48
(58) Field of Classification Search ................ 180/6.48, 180/308, 333, 305; 56/11.9, 14.7, 10.8; 417/269, 417/270, 271
See application file for complete search history.

(56) References Cited

U.S. PATENT DOCUMENTS

| | | | |
|---|---|---|---|
| 6,550,563 B2 * | 4/2003 | Velke et al. | 180/333 |
| 7,063,177 B1 * | 6/2006 | Crumly | 180/6.48 |
| 7,641,285 B2 * | 1/2010 | Jacobs | 298/18 |
| 2005/0183409 A1 * | 8/2005 | Barrier | 56/11.9 |
| 2007/0107403 A1 * | 5/2007 | Velke et al. | 56/14.7 |
| 2007/0137918 A1 * | 6/2007 | Dong et al. | 180/305 |

* cited by examiner

*Primary Examiner* — Árpád Fábián-Kovács
(74) *Attorney, Agent, or Firm* — James W. Miller

(57) ABSTRACT

A mower has a frame that supports a rotary cutting deck. The frame includes a pair of side rails that each extend from a front end in advance of the cutting deck to a rear end substantially behind the cutting deck. The front ends of the side rails support a pair of front caster wheels. The rear ends of the side rails have a raised, upwardly extending arch at which a hydraulic pump/motor assembly is mounted. The pump/motor assembly has an L-shaped configuration with the motor being located towards the bottom of the arch and outboard of the side rail and with the pump extending upwardly and inwardly from the motor to be located inboard of the side rail and within the vertical profile of the arch. The hydraulic motors drive a pair of rear drive wheels to propel the frame over the ground. A cross frame extends between the motors in the pump/motor assemblies to join the assemblies together. The deck is propelled from the frame by a plurality of struts extending between the cross frame and the deck.

13 Claims, 8 Drawing Sheets

MOWER FRAME WITH COMPACT MOUNTING FOR DUAL HYDRAULIC PUMP/MOTOR ASSEMBLIES

CROSS REFERENCE TO RELATED APPLICATIONS

This application is a continuation of application Ser. No. 12/009,631 filed Jan. 20, 2008, now abandoned.

TECHNICAL FIELD

This invention relates to a mower that carries a rotary cutting deck. More particularly, this invention relates to the frame of the mower and to a mounting for a pair of hydraulic pump/motor assemblies on the frame.

BACKGROUND OF THE INVENTION

Riding mowers having a zero radius turn (ZRT) capability are well known in the mowing art. Such mowers have a frame that carries a power source, such as an internal combustion engine, for propelling the frame over the ground and for providing power for mowing. Two powered rear drive wheels are carried on the frame with the front of the frame having a pair of unpowered front wheels, the wheels collectively supporting the frame for rolling over the ground. Often, the unpowered front wheels are caster wheels.

The rear drive wheels in a ZRT mower are individually powered by separate hydraulic drive motors that receive pressurized hydraulic fluid from a hydraulic system driven by the power source of the mower. The drive motors are individually controlled by separate control levers placed adjacent an operator's seat provided on the mower frame. The mower is steered by advancing one lever farther than the other to cause one drive motor, and thus the drive wheel on one side of the mower, to rotate faster than the other drive motor and drive wheel, thereby causing the vehicle to turn. Very sharp spin or ZRT type turns can be accomplished by advancing one control lever forwardly while pulling the other control lever rearwardly to cause the drive wheels on the opposite sides of the mower to simultaneously rotate in opposite directions.

A rotary cutting deck is carried at the front of the mower. The cutting deck usually houses a plurality of cutting blades that rotate about substantially vertical axes to cut grass in horizontal cutting planes. The blades are typically staggered relative to one another with a center blade being offset forwardly of a pair of side blades located on either side of the center blade. This allows the orbits of the cutting blades to overlap without having the blades contact one another, thus avoiding the need for timing the rotation of the blades. As the mower is driven over the ground and the blades are rotated, the blades cut a relatively large unbroken swath of grass during each pass of the mower. Exmark Mfg. Co., Inc. manufactures and sells ZRT mowers of this type under its Lazer Z brand name.

To change the height of cut (HOC) of the grass, the cutting deck is vertically moved up and down relative to the mower frame and thus relative to the ground to change the height of the cutting blades relative to the ground. In many known mowers, the HOC system used to do this includes multiple suspension links to the cutting deck. These movable links move up and down simultaneously with one another under the action of a single control lever. The control lever has a plurality of discrete adjusted positions relative to the mower frame, often established by the control lever engaging against a pin, to allow the height of cut of the cutting deck to be adjusted in a plurality of discrete increments. The height of cut is adjusted by changing the location of the pin within an array of adjustment holes provided therefor on the mower frame. The pin is selectively inserted by the operator into whichever adjustment hole corresponds to the desired height of cut.

The hydraulic system that powers the hydraulic motors that propel the drive wheels comprises one or more hydraulic pumps that are driven by the engine of the mower. In some cases, two separate pumps are used, one to power each hydraulic motor. Thus, four hydraulic components have to be mounted on the frame of the mower, namely two pumps and two motors. This presents various challenges in terms of finding or creating sufficient space on the frame of the motor to mount these components. Often, the frame of the mower is larger or taller than would be desirable due to the need to house the hydraulic components along with the other needed portions of the mower, such as the engine, battery, operator's seat, etc.

In addition, mower frames in mowers of this type often comprise relatively complicated weldments. These weldments typically have a number of side pieces that are welded together to extend from the front to the back of the mower along each side. These welded side pieces are then further welded to transverse cross members to form a unitary rigid frame. The side pieces that make up each side of the weldment along with the transverse cross members often restrict access to the interior of the frame. This complicates service, repair, maintenance or adjustment of the mower.

SUMMARY OF THE INVENTION

One aspect of this invention relates to a mower of the type having a mower frame. The frame comprises a pair of laterally spaced side rails with each side rail having a raised, upwardly extending arch along the length of the side rail. A rotary cutting deck is carried by the frame. A pair of hydraulic pumps and a pair of hydraulic motors are provided with the motors being driven by the pumps for propelling the frame over the ground. One pump and one motor are located adjacent each side rail. A mounting is provided for securing one pump and one motor to each side rail of the frame at the raised arch in the side rail with the pump being located inboard of the side rail and contained within a vertical profile of the arch and with the motor being located generally outboard of the arch and below the pump.

Another aspect of this invention relates to a mower which comprises a mower frame. The frame comprises a pair of laterally spaced side rails with each side rail having a raised, upwardly extending arch along the length of the side rail. The frame further includes a longitudinal frame member spanning across the arch of each side rail. A rotary cutting deck is carried by the frame. A pair of hydraulic motors are provided with the motors being driven for propelling the frame over the ground, one motor being located adjacent each side rail. A mounting is provided for securing one motor to the longitudinal frame member spanning across the arch of each side rail such that each motor is carried on each side rail at the raised arch in the side rail with the motor being located generally outboard of the arch.

Yet another aspect of this invention relates to a mower which comprises a frame that supports a rotary cutting deck. The frame includes a pair of side rails that each extend from a front end in advance of the deck to a rear end substantially behind the deck. The front ends of the side rails support a pair of front wheels and the rear ends of the side rails have a raised, upwardly extending arch at each of which a hydraulic pump/ motor assembly is mounted. Each pump/motor assembly has an L-shaped configuration with the motor being located towards a bottom of the arch and outboard of the side rail and with the pump extending upwardly and inwardly from the motor to be located inboard of the side rail and within a vertical profile of the arch. The hydraulic motors have drive shafts for driving rear drive wheels to propel the frame over the ground.

An additional aspect of this invention relates to a mower that comprises a frame that supports a rotary cutting deck. A pair of hydraulic motors mount to opposite sides of the frame for propelling the frame over the ground. A truss shaped cross frame extends between and joins the two motors together.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
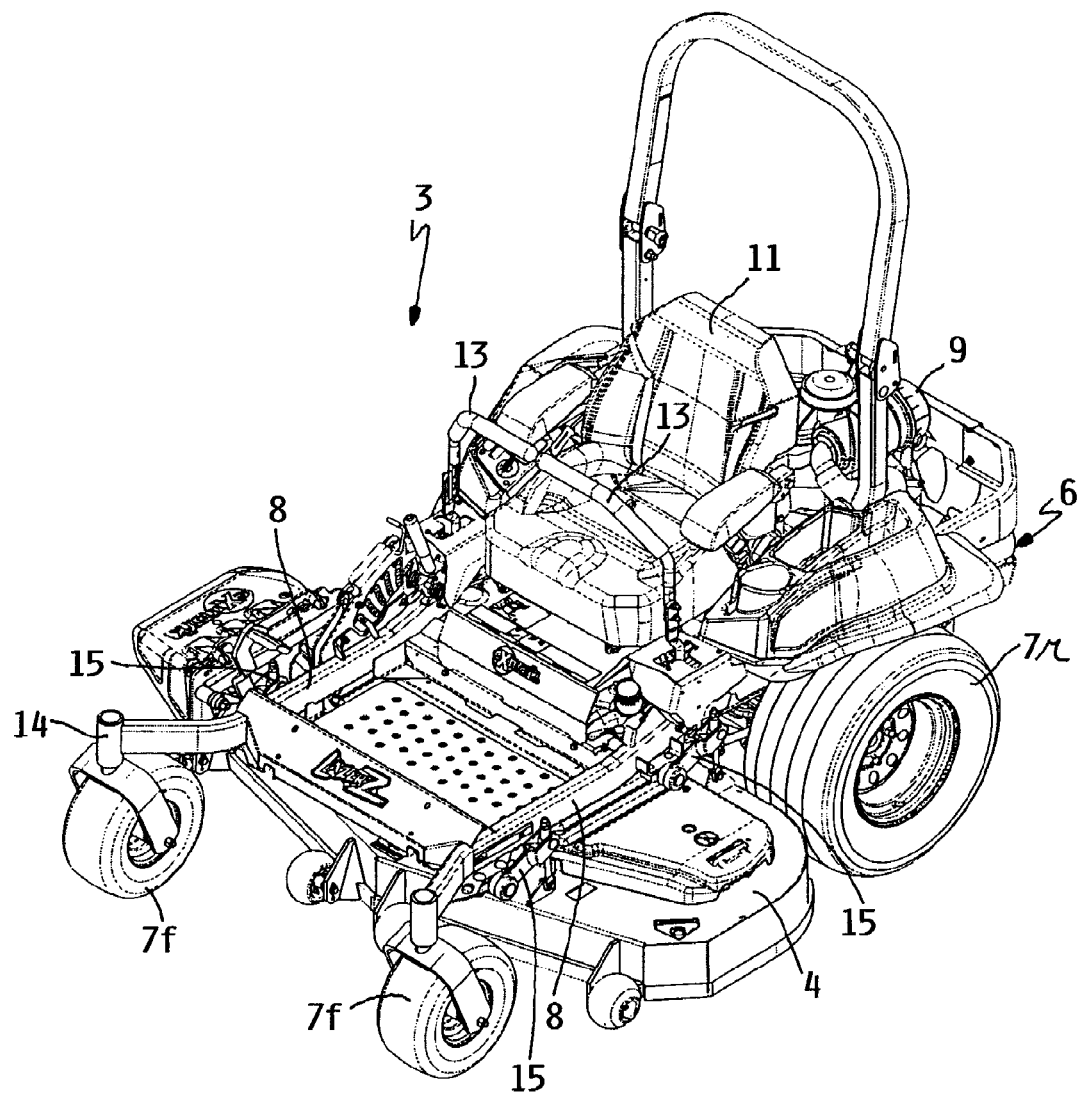
FIG. 1 is perspective view of a mower having the longitudinal side rails and the hydraulic pump/motor mounting of this.

Referring first to FIG. 1, a mower 3 has a frame 6 that supports a rotary cutting deck 4 adjacent the front thereof. Frame 6 is supported for rolling over the ground by a pair of rear drive wheels 7r, only one of which is shown in FIG. 1, and by a pair of front caster wheels 7f. A power source, such as in internal combustion engine 9, is carried at the rear of frame 6. An operator's seat 11 is placed forward of engine 9 and generally between rear drive wheels 7r for carrying a seated operator. Two control levers 13 are used by the operator to control the steering and propulsion provided by rear drive wheels 7r in a manner well known for zero radius turn (ZRT) mowers. Other operational controls are provided for starting and stopping the operation of deck 4. Mower 3 as illustrated herein is similar to, but is not limited to, the Lazer Z mowers manufactured and sold by Exmark Mfg. Co., Inc., the assignee of this invention.

This invention relates to side rails 8 that make up part of frame 6 and to a mounting that secures a pair of hydraulic pump/motor assemblies 26 to side rails 8. These aspects of the invention will be described hereafter.

A height of cut (HOC) system suspends deck 4 beneath frame 6 to adjust the height of cut of the grass being mowed. The HOC system includes multiple pivotal suspension links 15 between frame 6 and deck 4. Pivotal links 15 pivot up and down simultaneously with one another under the action of a single control lever. The control lever has a plurality of discrete adjusted positions relative to frame 6, established by the control lever engaging against a pin, to allow the height of cut of deck 4 to be adjusted in a plurality of discrete increments. The height of cut is adjusted by changing the location of the pin within an array of adjustment holes provided therefor on frame 6. The pin is selectively inserted by the operator into whichever adjustment hole corresponds to the desired height of cut. This type of HOC system is well known in the mower art and need not be further described herein.

Figure 3:
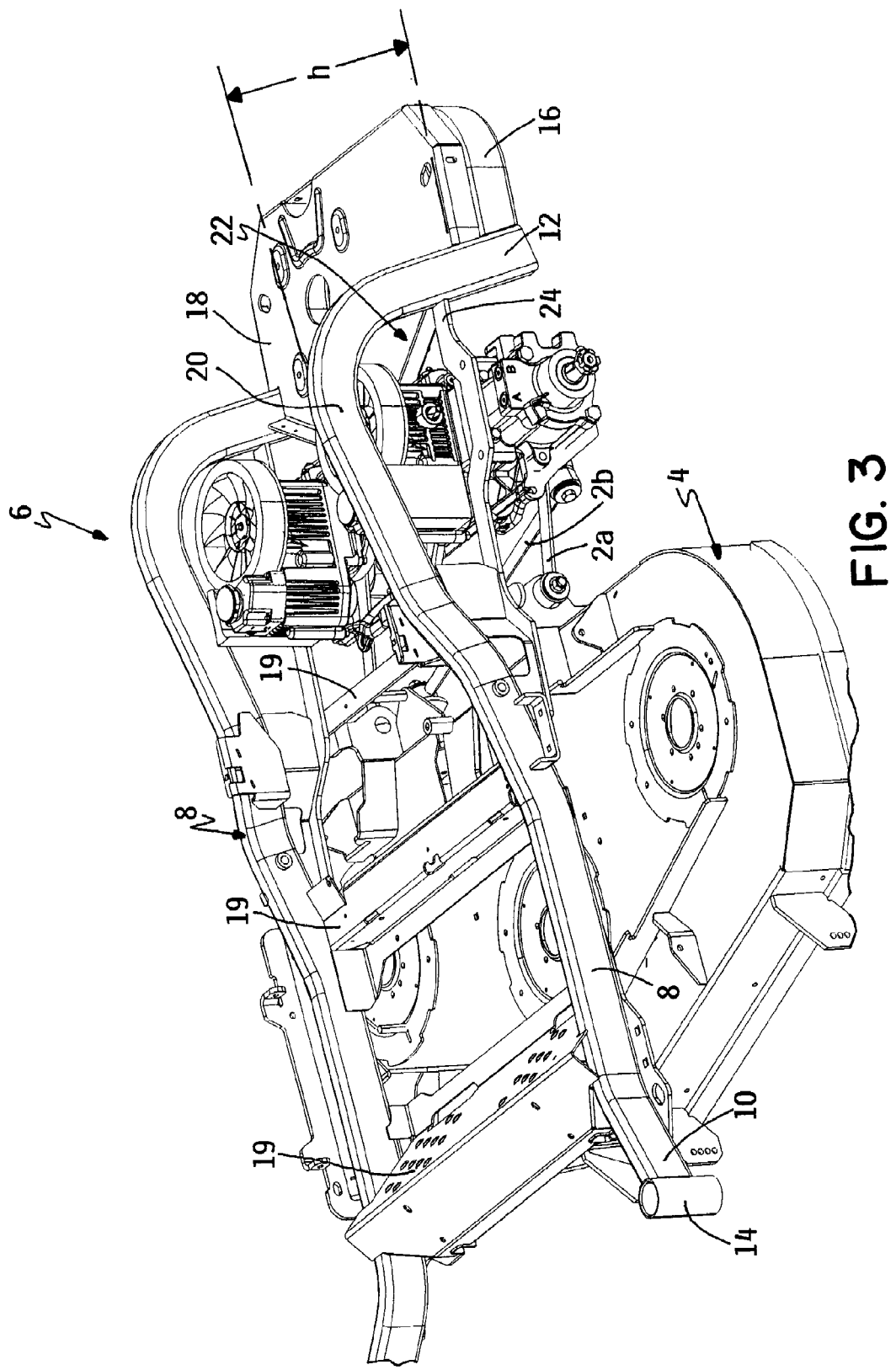
FIG. 3 is a perspective view of the portion of the frame of the mower and of the cutting deck shown in FIG. 2, particularly illustrating the side rails and the hydraulic pump/motor mounting of FIG. 2 from the side showing the arched rear ends of the side rails and the location of the hydraulic pump/motor mounting at the arched rear ends of the side rails.

Referring now to FIG. 3, frame 6 includes a pair of laterally spaced side rails 8. Side rail 8 is a continuous, one-piece, steel tube or beam all the way from its front end 10 to its rear end 12. This provides superior strength and simplicity in frame 6 compared to prior art mowers. A hub 14 is welded to front end 10 of side rail 8 to provide a vertical support for the vertical stem of a front caster wheel 7f. Alternatively, each side rail 8 could comprise a plurality of tube or beam sections welded to one another rather than being a continuous, one-piece, tube or beam.

Rear ends 12 of side rails 8 are joined and united together by a continuous, one-piece, rear rail 16. The opposite ends of rear rail 16 are welded to rear ends 12 of side rails 8. Rear rail 16 is U-shaped and extends rearwardly from rear ends 12 of side rails 8. An engine platform 18 for supporting a power source, such as internal combustion engine 9, is placed atop the U-shaped configuration of rear rail 16. Side rails 8 can also be joined and united by other transverse cross members 19.

Side rail 8 is generally flat or rises slightly over a front portion thereof, but then has a dramatic rise over the rear portion thereof followed by a sharp dropoff. The dramatic rise and sharp dropoff provides side rail 8 with a raised, asymmetrical arch 20 having a downwardly facing opening 22. A longitudinal frame member 24 spans across opening 22 to arch 20. The opposite ends of frame member 24 are fixed to side rail 8 on opposite sides of arch 20. Arch 20 has a significant height indicated at h in FIG. 3.

Figure 8:
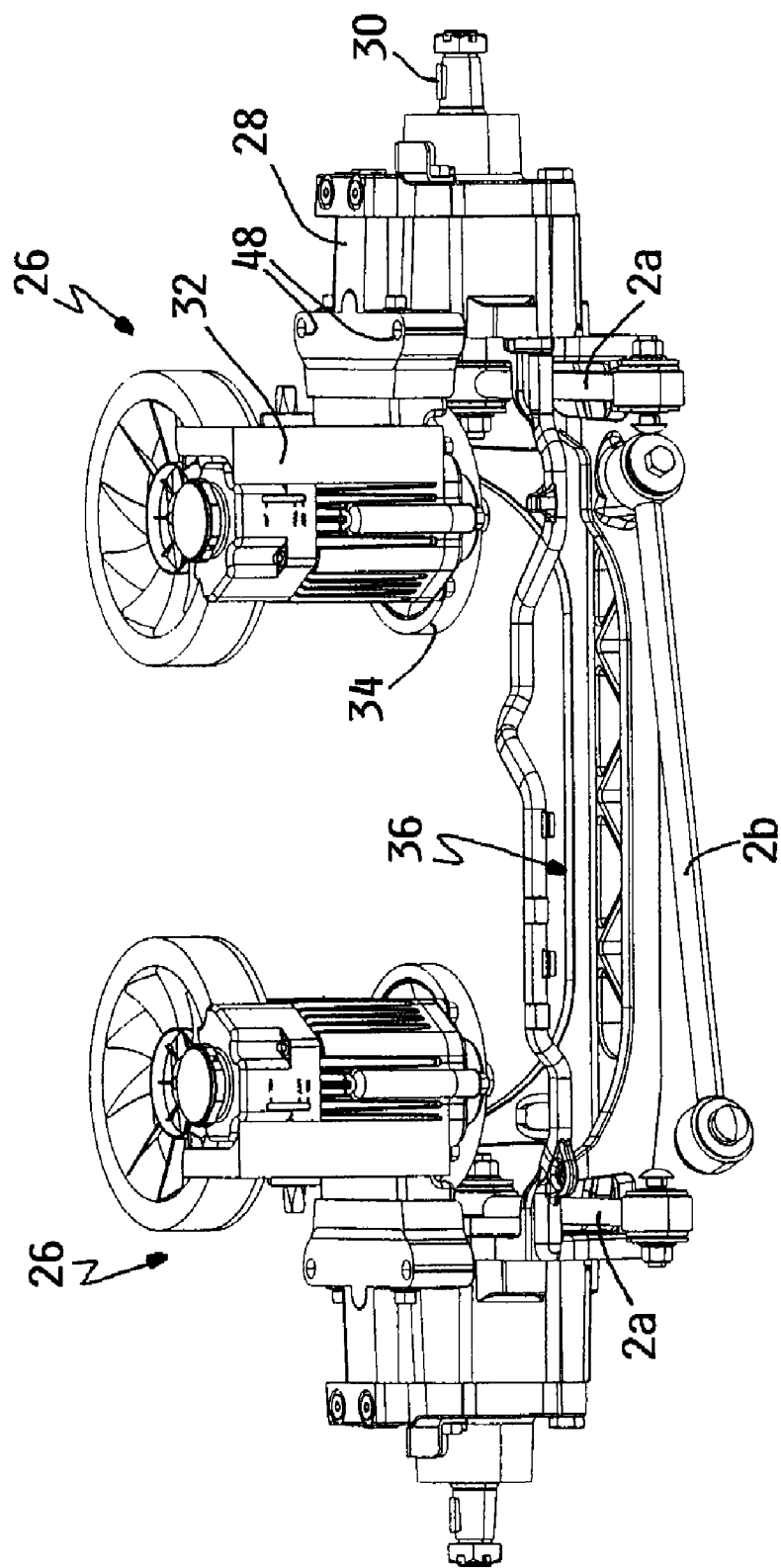
FIG. 8 is a perspective view particularly illustrating the cross frame that joins or unites the hydraulic pump/motor assemblies.

Referring now to FIG. 8, two integrated hydraulic pump/motor assemblies 26 are used to power the mower in a ZRT fashion. Each assembly 26 comprises a hydraulic motor 28 having an output shaft 30 that is coupled to the hub of a ground engaging drive wheel 7r of the mower. A hydraulic pump 32 is integrally connected to motor 28 to be a part thereof, i.e. motor 28 and pump 32 comprise a single unit. Pump 32 is connected to the top of motor 28 and extends upwardly therefrom. Thus, pump/motor assembly 26 has a generally L-shaped configuration as best shown in FIG. 8. Each pump 32 is driven by a belt drive (not shown) from the engine of the mower to a pulley 34 located on the bottom of pump 32.

A cross frame 36 unites and joins pump/motor assemblies 26 together. Cross frame 36 is in the form of an elongated truss having a pair of parallel beams 38 bridged by integral reinforcing ribs 40 that are inclined relative to the axes of elongation of beams 38. See FIGS. 2 and 4. An upwardly extending cradle 42 is provided at each end of cross frame 36 with cradle 42 being joined to the adjacent ends of beams 38. See FIG. 5. Cross frame 36 is preferably formed as a one-piece, cast metallic member such as an aluminum casting. However, in lieu of a one-piece casting, cross frame 36 could be made as a weldment in which a plurality of parts are welded together.

Figure 4:
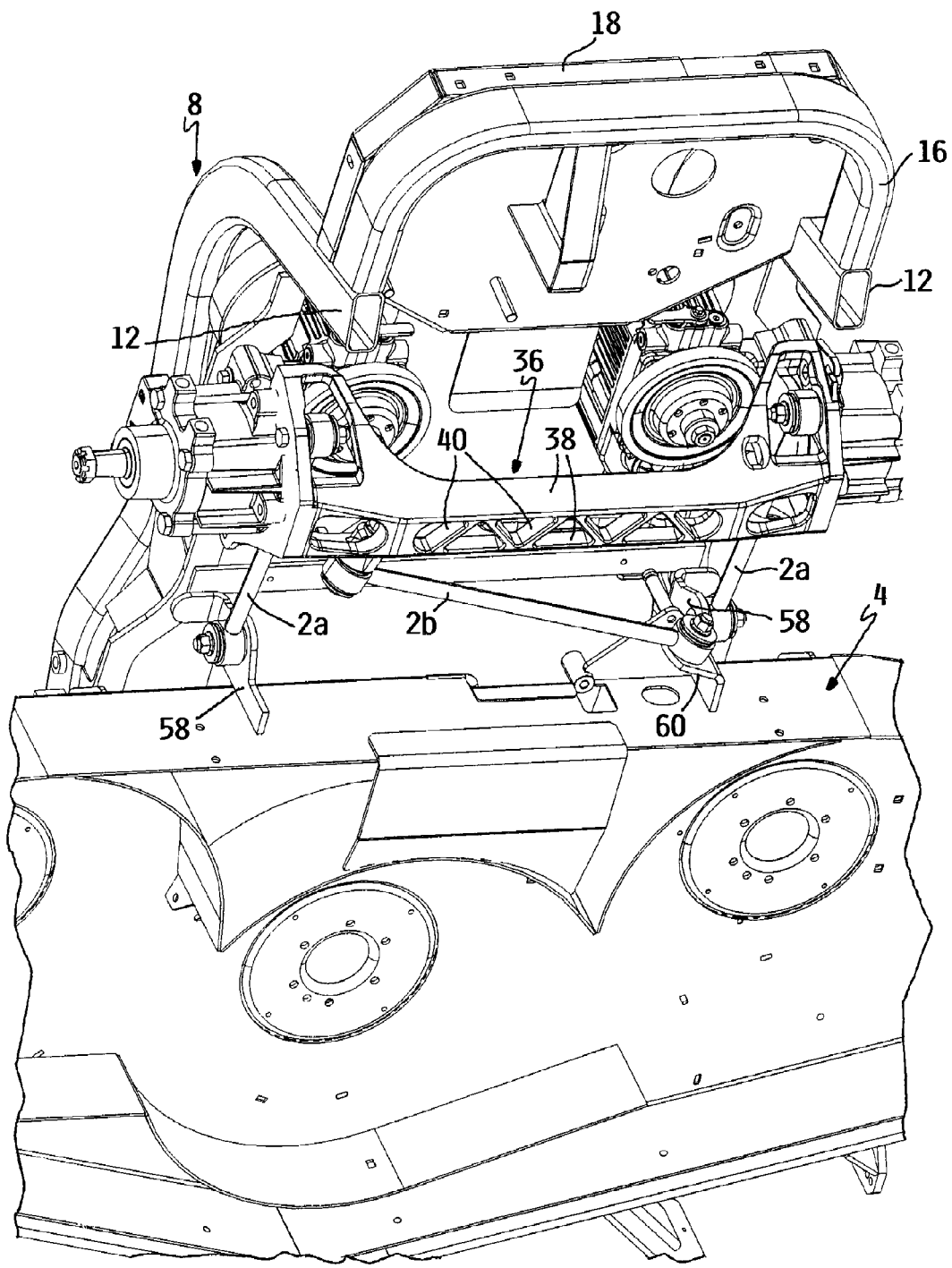
FIG. 4 is an enlarged perspective view of the side rails and hydraulic pump/motor mounting of FIG. 2, particularly illustrating various propulsion and stabilization struts extending between flanges on the rear of the cutting deck and a cross frame that extends between the pair of hydraulic pump/motor assemblies carried on the side rails on opposite sides of the mower.
Figure 5:
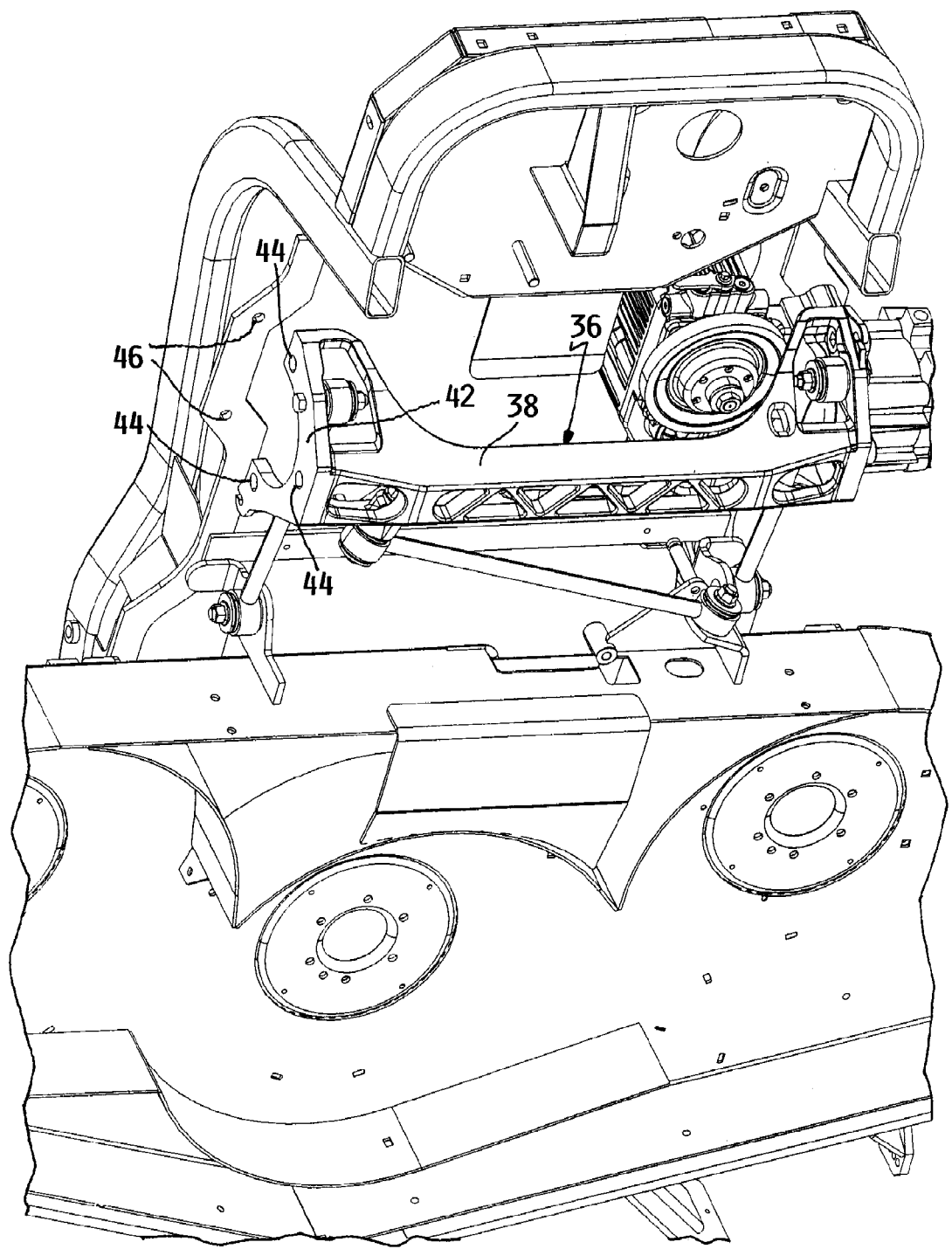
FIG. 5 is a perspective view similar to FIG. 4, but with one of the pump/motor assemblies having been removed for the purpose of clarity.
Figure 6:
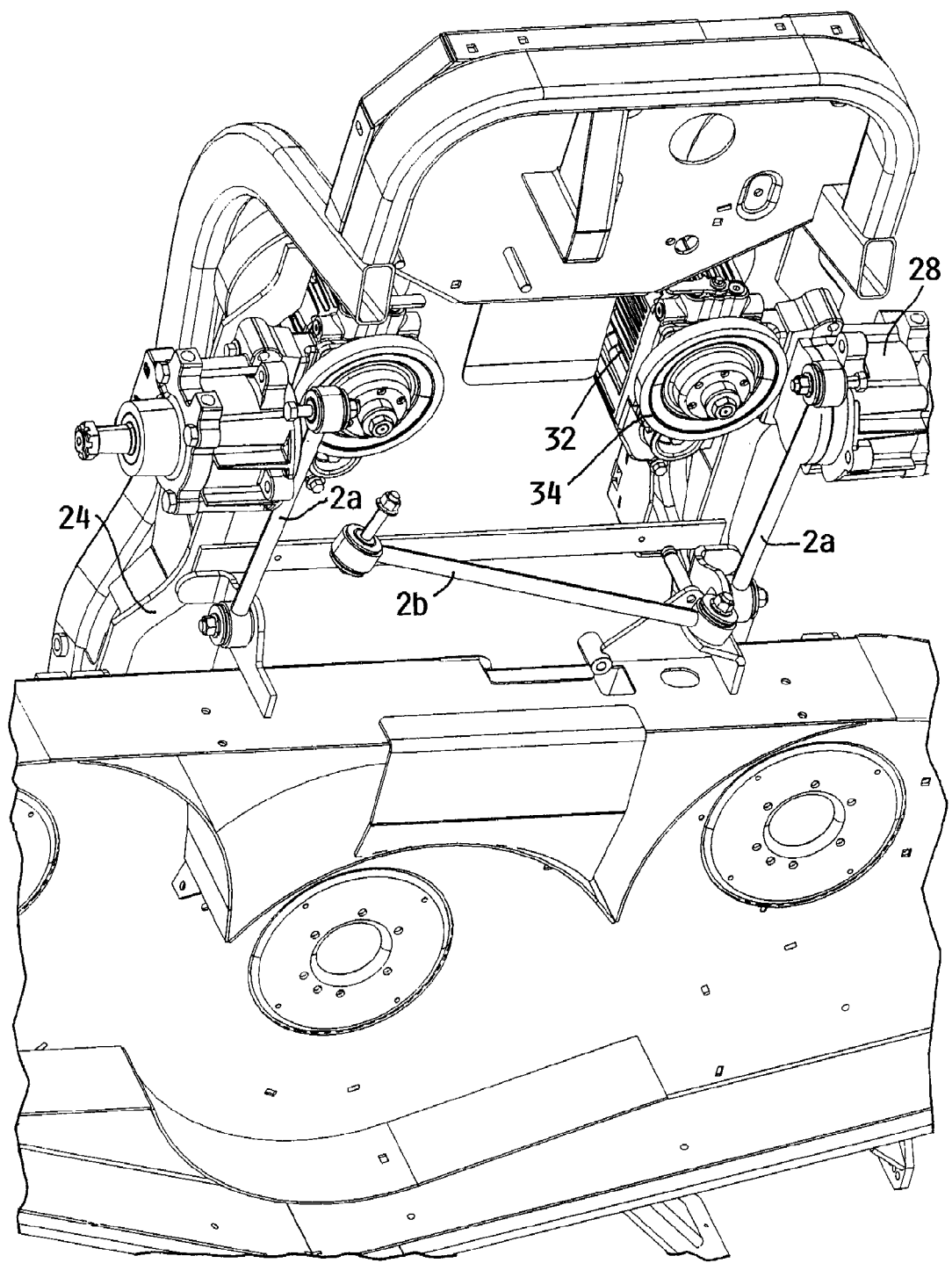
FIG. 6 is a perspective view similar to FIG. 4, but with the cross frame having been removed for the purpose of clarity.

Cradle 42 at each side of cross frame 36 has a plurality of spaced apertures 44. This permits motor 28 in each pump/motor assembly 26 to be bolted thereto. As shown in FIG. 4, when so bolted, motor 28 is located laterally outside cross frame 36, but pump 32 in each pump/motor assembly 26 is located vertically above and overlies the adjacent end of cross frame 36 due to the L-shaped configuration of pump/motor assembly 26.

Figure 2:
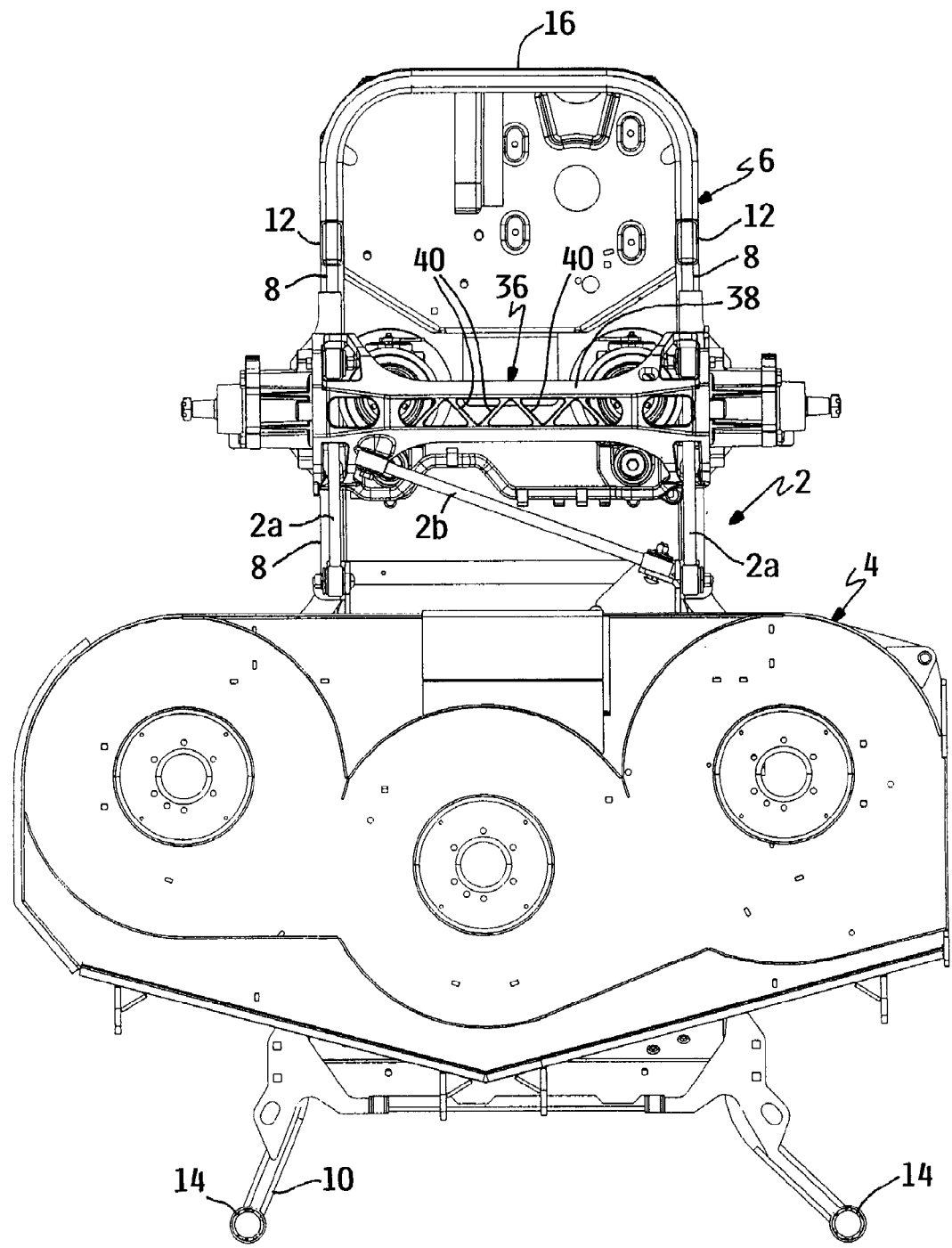
FIG. 2 is a bottom plan view of a portion of the frame of the mower of FIG. 1 and of a portion of the cutting deck carried thereby, particularly illustrating the longitudinal side rails and the hydraulic pump/motor mounting of this invention in which a pair of hydraulic pump/motor assemblies are mounted to the side rails.

To attach each pump/motor assembly 26 to the mower, motor 28 in each assembly 26 is bolted to the longitudinal frame member 24 spanning arch 20 in side rails 8. As shown in FIG. 2, each longitudinal frame member 24 has a plurality of bolt holes 46 that will receive bolts (not shown) that extend through mating apertures 48 in motor 28. Mating apertures 48 in motor 28 are best shown in FIG. 8.

In any event, when the two motors 28 are bolted to the longitudinal frame members 24 on the opposite side rails 8, the pump/motor assemblies 26 will be carried on frame 6 with cross frame 36 extending laterally across frame 6. When so mounted, pumps 32 themselves will be inboard of side rails 8 and positioned within the vertical profile of arches 20 of side rails 8. In other words, pumps 32 will not vertically extend beyond the vertical height h of arches 20 in side rails 8. Thus, side rails 8 protect pumps 32 while providing a compact inboard mounting of pumps 32. When so mounted, cross frame 36 that joins the pump/motor assemblies 26 will be quite low on the mower and approximately at the level of deck 4.

Struts 2 extend between cross frame 36 and the rear of deck 4. There are three struts 2, namely two longitudinal struts 2a that provide thrust to deck 4 in longitudinal forward or reverse directions and one lateral strut 2b that provides lateral stabilization to deck 4.

Figure 7:
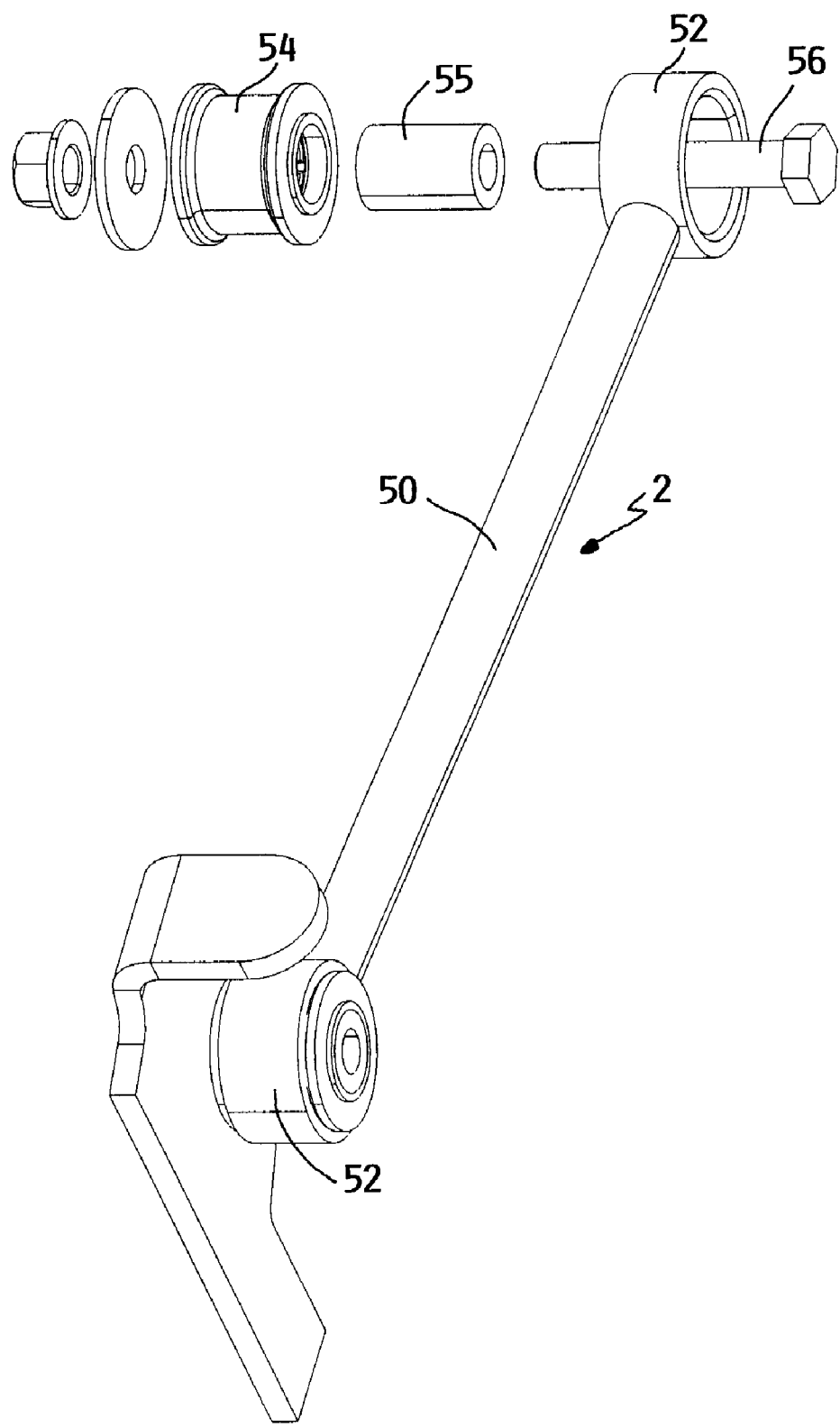
FIG. 7 is a perspective view of one of the struts used to connect the cross frame between the pair of hydraulic pump/motor assemblies to the deck, particularly illustrating one end of the strut in an exploded configuration.

Referring now to FIG. 7, each strut 2 comprises a substantially solid, elongated rod or bar 50 having a pair of hubs 52 at either end. Hubs 52 are only slightly wider than the width of rod or bar 50. Hubs 52 enclose and support a rubber bushing 54. Bushing 54 is a compliant suspension bushing that is often used in automotive applications and is sometimes referred to as a Clevite bushing.

Hubs 52 at each end of rod or bar 50 are pivotally coupled to either deck 4 or cross frame 36 by pivot pins 56. Each pivot pin 56 passes through an inner pivot bushing 55 that will be rigidly clamped in place inside hub 52 when the nut 57 on the end of pivot pin 56 is tightened against some portion of deck 4 or cross brace 36. Rubber bushing 54 will concentrically surround inner pivot bushing 55 when the pivot connection formed thereby is assembled together around pivot pin 56. Rubber bushings 54 allow spherical or three axis motion of hubs 52 relative to pivot pins 56 and relative to pivot bushings 55.

For the two longitudinal struts 2a, hubs 52 at the rear thereof are pivotally connected to cross frame 36 at the rear of cross frame 36, namely at positions underlying the rear ends of pumps 32 in each of the pump/motor assemblies 26. Hubs 52 at the front thereof connect to simple vertical flanges 58 at the rear of deck 4. Hub 52 at the rear of lateral strut 2b is pivotally connected to cross frame 36, but this time to the front of cross frame 36. Lateral strut 2b extends to the side and somewhat forwardly with hub 52 at the front of lateral strut 2b being connected to a flange 60 on the rear of deck 4. Flange 60 is inclined to match the angle of inclination of strut 2b as strut 2b extends to the side and forwardly. See FIGS. 2 and 5. Struts 2a and 2b are effective in providing deck propulsion and in laterally locating and stabilizing deck 4 on frame 6.

Cross frame 36 provides various advantages. The strength of the truss design of cross frame 36 enables motors 28 to remain parallel to one another and relative to side rails 8 of frame 6. Thus, the tires carried on rear drive wheels 7r remain better aligned with respect to toe-in, camber, caster and the like. Accordingly, the tires will wear better and require less frequent replacement. In addition, cross frame 36 keeps the lateral distance or spacing between motors 28 constant and prevents motors 28 from shifting or changing in lateral separation.

In addition, cross frame 36 effectively serves as a main lateral cross member of frame 6 in the area of arches 20 without the need for other lateral cross members in the same area. This is true even though cross frame 36 only joins the two separate pump/motor assemblies 26 with only motors 28 being directly secured to frame 6, i.e. to the longitudinal frame members 24 that span arches 20. Thus, frame 6 has a relatively open, unobstructed design from underneath arches 20 allowing easier access to the interior of frame 6 from the bottom thereof simply by reaching around cross frame 36 to gain access to pumps 32, the pump linkages and hoses, etc. See FIG. 2. As noted earlier, cross frame 36 also serves as the rear support or anchor for the struts 2 that propel and laterally stabilize deck 4.

Accordingly, cross frame 36 performs a number of functions. It unites and joins the two separate pump/motor assemblies 26 and helps keep motors 28 aligned with each other and with frame 6 to improve tire wear. It functions as a main transverse cross member of frame 6. It serves as the support for the rear ends of the propulsion and stabilization struts 2. Thus, cross frame 36 efficiently performs all these different tasks without requiring additional members or structure on the underside of frame 6. This avoids cluttering frame 6 with unnecessary structure.

The use of integrated pump/motor assemblies 26 is preferred. However, it would be possible to use a single hydraulic pump 32 driving a pair of hydraulic motors 28. In this case, hydraulic motors 28 would be mounted to the undersides of longitudinal frame members 42 as before, and cross frame 36 would still desirably extend between and join motors 28. However, pump 32 would be mounted separately, preferably still within the profile of arches 20 though pump 32 could even be placed outside the arched area of frame 6. Securing motors 28 themselves to arches 20 is still an effective place for mounting motors 28 and the use of cross frame 36 still provides all the various advantages noted earlier relative to motor alignment, frame design, and deck propulsion and stabilization.

Arches 20 in side rails 8 also have various advantages. As noted, pumps 32 and linkages to the pumps are protected within the vertical profiles of arches 20 and by the unitized motors 28 connected to pumps 32. Arches 20 also reduce the length of the rollover protection system (ROPS) by having those portions of side rails 8 to which the ROPS is connected be in a higher initial position. This also helps simplify mounting of seat 11. Moreover, arches 20 provide expansion areas for mounting larger pump/motor assemblies 26.

Various other modifications of this invention will be apparent to those skilled in the art. Thus, the scope of the invention shall be limited only by the appended claims.

We claim:

1. A mower, which comprises:
   a) a mower frame, wherein the frame comprises a pair of laterally spaced side rails with each side rail having a raised, upwardly extending arch along the length of the side rail;
   b) a rotary cutting deck carried by the frame;
   c) a pair of hydraulic pumps and a pair of hydraulic motors with the motors being driven by the pumps for propelling the frame over the ground, one pump and one motor being located adjacent each side rail;
   d) a mounting for securing one pump and one motor to each side rail of the frame at the raised arch in the side rail with the pump being located generally inboard of the side rail and contained within a vertical profile of the arch and with the motor being located generally outboard of the arch and below the pump;
   e) a cross frame extending between and joining the motors mounted to the side rails, wherein the cross frame comprises a pair of parallel beams connected by a plurality of connecting members that are spaced apart relative to one another along the length of the beams such that the beams and connecting members form a truss with the connecting members both joining and reinforcing the beams.

2. The mower of claim 1, wherein one pump and one motor comprise an integrated pump/motor assembly that forms a single unit with the pump extending above and to one side of the motor in a generally L-shaped configuration.

3. The mower of claim 2, further including a longitudinal frame member spanning across the arch of each side rail, and wherein each pump/motor assembly is secured to the longitudinal frame member by fastening the motor of each assembly to the longitudinal frame member, thereby locating the pump of each assembly inboard of and within the vertical profile of the arch by virtue of the L-shaped configuration between the pump and the motor.

4. The mower of claim 1, wherein the arch is at rear ends of the side rails.

5. The mower of claim 1, wherein the side rails comprise tubes or beams extending from a front end in advance of the cutting deck to a rear end located substantially behind the cutting deck.

6. The mower of claim 5, wherein the arches in the side rails are located behind the cutting deck.

7. The mower of claim 5, wherein the side rails comprise continuous, one-piece tubes or beams.

8. The mower of claim 1, wherein the pair of parallel beams each have an axis of elongation with the axes of elongation of the beams being parallel to each other, and wherein the connecting members extend in directions that are angled relative to the axes of elongation of the beams.

9. A mower, which comprises:
   (a) a mower frame that supports a rotary cutting deck;
   (b) a pair of hydraulic motors mounted to opposite sides of the mower frame for propelling the mower frame over the ground; and
   (c) a truss shaped cross frame extending between and joining the two motors together, wherein the cross frame comprises:
      (i) a first lateral cross beam elongated along a first axis of elongation;
      (ii) a second lateral cross beam elongated along a second axis of elongation that is parallel to the first axis of elongation of the first cross beam such that the cross beams are parallel to one another;
      (iii) the first and second cross beams being longitudinally spaced from one another;
      (iv) a plurality of reinforcing ribs that bridge between and join the first and second cross beams together with the ribs being spaced apart along the length of the first and second cross beams; and
      (v) wherein the cross beams and the ribs are formed as a one-piece, cast metallic member.

10. The mower of claim 9, wherein opposite left and right ends of the cross frame each have an upwardly extending cradle that further connects the cross beams together, and wherein one motor is secured to the cradle at the left end of the cross frame and the other motor is secured to the cradle at the right end of the cross frame.

11. The mower of claim 9, wherein there are openings between the ribs to provide interstitial open spaces between the ribs such that the ribs and the cross beams form an open truss.

12. The mower of claim 11, wherein the ribs form a zig-zag pattern between the cross beams.

13. A mower, which comprises:
   (a) a mower frame that supports a rotary cutting deck;
   (b) a pair of hydraulic motors mounted to opposite sides of the mower frame for propelling the mower frame over the ground; and
   (c) a truss shaped cross frame extending between and joining the two motors together, wherein the cross frame comprises:
      (i) a first lateral cross beam elongated along a first axis of elongation;
      (ii) a second lateral cross beam elongated along a second axis of elongation that is parallel to the first axis of elongation of the first cross beam such that the cross beams are parallel to one another;
      (iii) the first and second cross beams being longitudinally spaced from one another; and
      (iv) a plurality of reinforcing ribs that bridge between and join the first and second cross beams together with the ribs being spaced apart along the length of the first and second cross beams, wherein there are openings between the ribs to provide interstitial open spaces between the ribs such that the ribs and the cross beams form an open truss, and wherein the ribs form a zig-zag pattern between the cross beams.

* * * * *